Patented Sept. 19, 1922.

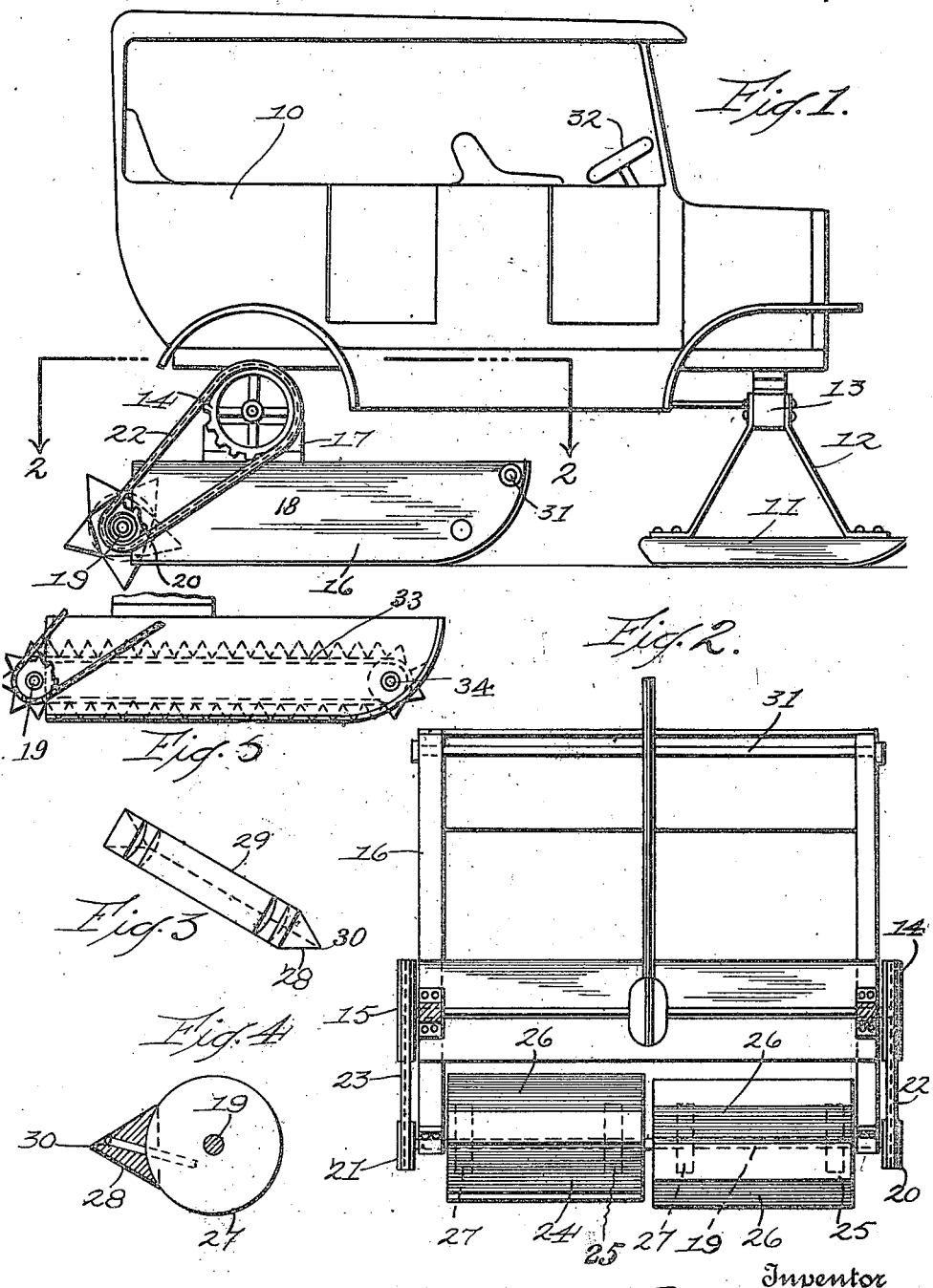

1,429,658

UNITED STATES PATENT OFFICE.

IVER UREVIG, OF WILLISTON, NORTH DAKOTA.

AUTOMOBILE SLED.

Application filed July 23, 1920. Serial No. 398,440.

*To all whom it may concern:*

Be it known that I, IVER UREVIG, a citizen of the United States, residing at Williston, county of Williams, and State of North Dakota, have invented certain new and useful Improvements in Automobile Sleds, of which the following is a specification.

This invention relates to motor driven sleds, and particularly to sleds which can be readily and conveniently attached to any automobile after the removal of the wheels thereof.

It is the principal object of the invention to provide a sled in which the power developed by the rotation of the rear axle of an automobile is used to propel the sled along the snow- or ice-covered road or the like.

Another object of the invention is to provide a motor driven sled adapted to be steered by the ordinary steering wheel of the automobile.

Further objects and advantages of the invention will become apparent as the description proceeds and reference will be had to the accompanying drawing, and the appended claim in which the various novel features of the invention are more particularly set forth.

In the drawing—

Figure 1 shows an automobile converted into a sled constructed according to the present invention in side view.

Figure 2 is a top plan view thereof, seen along line 2—2 of Figure 1.

Figure 3 is a perspective detail view of one of the propelling members, and

Figure 4 is a side view of the propulsion wheels with one of the propelling elements secured thereto.

Figure 5 shows a modified form of propelling device.

After removal of the wheels of an automobile 10, the runners 11 are secured by brackets 12 to the front axle 13 thereof, while sprocket wheels 14 and 15 are secured to the rear axle to which the rear runners 16 are secured by the brackets 17. In the side walls of the rear runners a shaft 19 is journaled which carries at its outer ends sprocket wheels 20 and 21 over which are guided sprocket chains 22 and 23, also guided over the sprocket wheels 14 and 15.

The shaft 19 carries pairwise arranged wheels 25 and 27 within casings 24 and 26 formed by slats 28, several of which are secured with their ends to the periphery of each pair of wheels 25 and 27 in the manner indicated in Figure 4.

Figure 3 shows a detailed view of one of these slats 28, each of which has a body part 29 of triangular cross section adapted to engage the snow covered ground with its pointed apex 30. The front ends of the rear runners are connected by removable bars or rods 31, and the steering of the front runners is effected by the ordinary steering wheel 32 of the automobile steering the front axle in the well known manner.

The operation of the sled will be apparent from the above description, and a further detailed explanation thereof is therefore not deemed necessary, it being apparent when the motor is started to rotate the rear axle, the propelling members will propel the sled through practically continuous propelling impulses so that the travel of the sled will be practically continuous.

In Figure 5 a modified form of propelling device is illustrated in which between the runners 16 an apron 33 is arranged which is running over the axle 19 and a shaft 34 secured between the two runners 16 near their front ends.

Changes may be made in the general arrangement of parts and the construction of the minor details without departing from the scope and spirit of the invention.

Having thus described my invention what I claim as new and desire to secure by Letters Patent of the United States is—

A propelling means for motor sleds, comprising a shaft, a plurality of wheels on said shaft, a plurality of slats secured with their ends to the periphery of each pair of said wheels, each of said slats having a body part of triangular cross-section adapted to engage the snow covered ground with its pointed apex, and means for securing said slats on said wheels.

In testimony whereof I have affixed my signature.

IVER UREVIG.